(12) United States Patent
Li et al.

(10) Patent No.: US 6,771,585 B2
(45) Date of Patent: Aug. 3, 2004

(54) INTERFERENCE OF CONVERGING SPHERICAL WAVES WITH APPLICATION TO THE DESIGN OF LIGHT-READABLE INFORMATION-RECORDING MEDIA AND SYSTEMS FOR READING SUCH MEDIA

(75) Inventors: Yajun Li, Oakdale, NY (US); Emil Wolf, Rochester, NY (US)

(73) Assignee: Wea Manufacturing, Inc., Olyphant, PA (US)

( * ) Notice: Subject to any disclaimer, the term of this patent is extended or adjusted under 35 U.S.C. 154(b) by 631 days.

(21) Appl. No.: 09/843,343

(22) Filed: Apr. 25, 2001

(65) Prior Publication Data

US 2001/0036140 A1 Nov. 1, 2001

Related U.S. Application Data

(60) Provisional application No. 60/201,562, filed on May 1, 2000.

(51) Int. Cl.[7] .................................................. G11B 7/00

(52) U.S. Cl. ................................ 369/112.24; 369/275.3

(58) Field of Search .......................... 369/47.25, 275.3, 369/275.4, 44.26, 47.27, 112.21, 112.23, 112.24

(56) References Cited

U.S. PATENT DOCUMENTS

| | | | |
|---|---|---|---|
| 4,768,183 A | * 8/1988 | Ohnishi et al. | ......... 369/112.05 |
| 5,068,846 A | 11/1991 | Kramer | .................... 369/275.1 |
| 5,475,537 A | 12/1995 | Kobayashi et al. | ......... 359/794 |
| 5,995,481 A | 11/1999 | Mecca | ..................... 369/275.4 |

FOREIGN PATENT DOCUMENTS

WO    PCT/US97/15911    3/1999

OTHER PUBLICATIONS

G. Bouwhuis et al., "Principles of Optical Disc Systems," 1st ed., Adam Hilger Ltd., Bristol and Boston, pp. 17–19, 1985.
K.C. Pohlmann, "The Compact Disc," ch. 3, Updated ed., A–R Editions, Inc., Madison, pp. 54–60, 1992.
H.H. Hopkins, "Diffraction Theory of Laser Read–Out Systems of Optical Discs," Journal of the Optical Society of America, vol. 69, No. 1, pp. 4–24, Jan. 1979.

(List continued on next page.)

Primary Examiner—Nabil Hindi
(74) Attorney, Agent, or Firm—Fish & Neave; Robert R. Jackson

(57) ABSTRACT

An improved light-readable information recording medium is provided that comprises an optical data storage structure having lands and pits, in which the depth of the pits is about:

$$\frac{\lambda}{2n} \frac{M}{1+m_T^2},$$

wherein $\lambda$ is the wavelength of light used to read the information recording medium, m is the order of interference selected from a group consisting of odd integers, $M_T$ is the transverse magnification, and n is the refractive index encountered by the reading light inside the pits. The invention also provides an improved optical reading system with the parameters satisfying the relationship:

$$nd \simeq \frac{\lambda}{2} \frac{m}{1+M_T^2},$$

wherein $\lambda$ is the wavelength of light used to read the information recording medium, m is the order of interference selected from a group consisting of odd integers, $M_T$ is the transverse magnification, n is the refractive index encountered by the reading light inside the pits, and d is the depth of the pits.

44 Claims, 6 Drawing Sheets

OTHER PUBLICATIONS

J.G. Dil et al., "Apparent Size of Reflecting Polygonal Obstacles of the Order of One Wavelength," Journal of the Optical Society of America, vol. 69, No. 7, pp. 950–960, Jul. 1979.

M. Born et al., "Principles of Optics," 7th ed., Cambridge University Press, Cambridge, sections 8.2 and 8.8, 1999.

E. Collett et al., "Symmetry Properties of Focused Fields," Optics Letters, vol. 5, No. 6, pp. 264–266, Jun. 1980.

E.H. Linfoot et al., "Phase Distribution Near Focus in an Aberration–Free Diffraction Image," The Proceedings of the Physical Society, vol. 69, Part 7, No. 439 B, pp. 823–832, Jul. 1, 1956.

C.M.J. Mecca et al., "Interference of Converging Spherical Waves With Application to the Design of Compact Disks," Optics Communications, vol. 182, pp. 265–272, Aug. 15, 2000.

* cited by examiner

INTERFERENCE OF CONVERGING SPHERICAL WAVES WITH APPLICATION TO THE DESIGN OF LIGHT-READABLE INFORMATION-RECORDING MEDIA AND SYSTEMS FOR READING SUCH MEDIA

CROSS REFERENCE TO RELATED APPLICATIONS

This application claims the benefit of copending U.S. Provisional Application No. 60/201,562, filed on May 1, 2000, which is hereby incorporated by reference in its entirety.

BACKGROUND OF THE INVENTION

This invention relates to an improved design of information recording media, for example in the form of light-readable discs, and an improved design of optical reading equipment used for reading such information recording media. These improved designs, among other advantages, will allow greater tolerances in manufacturing of the information recording media and will permit the use of less expensive optical reading equipment.

Information recording media in the form of light-readable discs are well known, as shown, for example in Kramer U.S. Pat. No. 5,068,846 and Mecca U.S. Pat. No. 5,995,481. Commercially available audio compact discs ("CDs") and compact disc read-only memories ("CD-ROMs") are examples of recording media of this general type.

The predominant portion of a typical light-readable disc comprises a transparent material, such as polycarbonate plastic. Information in the form of binary data is contained in a pit and land structure impressed along the top surface of this transparent material. The structure is covered by a very thin metal reflective layer, typically aluminum. A protective layer, typically lacquer, is then placed over the reflective layer, so that the protective layer fills the indentations in the reflective layer and provides a smooth, substantially planar upper surface for the disc on which a label or other information may be placed.

The pits and lands optical structure of the light-readable disc's medium can be read by a laser beam focused on the reflective layer. The laser beam passes through the bottom of the transparent material and through the optical structure of pits and lands (which is seen by the laser from below as a series of bumps and lands), and is reflected off the reflective layer, through the transparent material and out of the medium to an optical reading structure.

Several publications conclude, based on elementary properties of interference between the incident and reflected waves, that the maximum extinction of the returned light is obtained when the light reflected by a pit is in antiphase with the light reflected by the surrounding land, namely, when the pit depth/bump height (depending on the plane of reference) is a quarter-wavelength. (G. Bouwhuis et al., *Principles of Optical Disc Systems*, 1$^{st}$ ed.(1985); K. Pohlmann, The Compact Disc, Updated ed. (1992); Dil et al., *J. Opt. Soc. Am.*, 69:950 (1979)). This has led to the standardization of pit depth/bump height (depending upon the plane of reference) in commercial light-readable information recording media at just less than approximately one-quarter of the wavelength of the laser light within the transparent material.

However, recent findings revealed that the quarter wavelength criterion did not predict optimum results under all circumstances. As reported in Mecca U.S. Pat. No. 5,995,481, it had been determined that an improved light-readable recording disc was achieved by designing the pit depth/bump height to be approximately one-half of the wavelength of the laser light source. Not only such a disc had been found to be operable, but it had been determined that the intensity difference between the bump and land areas detected by an optical reader was actually greater than for the one-quarter wavelength pit previously thought to be optimal.

Numerous efforts had been undertaken to understand and/or explain the unexpected and improved results obtained by controlling pit height to approximately one-half the wavelength of light. None have borne fruit until now.

The present invention provides a way to optimize performance of both information recording media and the optical reading equipment by using a two-point-source model to simulate the waves reflected from the data surface of the recording media. The improved results promise substantial savings in the design and manufacture of less sensitive and less costly light-reading systems, as well as in disc manufacturing. Since a higher intensity signal difference is generated, manufacturing tolerances can be relaxed without sacrificing quality in the output and reading of data, leading to higher yields and lower costs.

In view of the foregoing, it is an object of this invention to provide a light-readable information recording medium and an optical reader that generate greater signal intensity difference, which can improve the quality of reproduction, reduce the cost and complication of optical reading devices, and provide for greater tolerance in the manufacturing of such recording media.

SUMMARY OF THE INVENTION

These and other objects of the present invention are accomplished as follows. According to the new model, two spherical (not plane) waves return from the data surface and travel to the objective lens. One spherical wave is due to the reflection of the read-out beam from the pit, the other is due to the reflection from the surrounding land. The returning field then results from the superposition of two spherical waves, which first diverge from the disc and are then focused by the objective lens onto the photodetector. Consequently, according to the model presented in this invention, one is dealing with interference of two converging spherical waves with slightly different foci, slightly different focal lengths and slightly different cone angles, rather than with interference of two plane waves. The focal regions of the two converging spherical waves are overlapping, and the interference of the two focused spherical waves takes place in the common region.

This two-point-source model was next applied to investigate how binary data recorded on a surface of an information recording medium are transferred into series of light pulses. The analysis resulted in an expression for the optical pit depth in terms of the system parameters for which destructive interference leads to a maximum extinction of the light in the focal region:

$$\Delta_{opt} = \frac{\lambda}{2} \frac{m}{1 + M_T^2},$$

wherein $\lambda$ is the wavelength of the light used to read the information recording medium, m is the order of interference selected from a group consisting of odd integers, and $M_T$ is the transverse magnification of the reader.

Accordingly, the present invention provides an information recording medium, which can be read by an optical reader using reflected light, comprising an optical data storage structure including pits and lands, in which the depth of the pits is equal to about:

$$\frac{\lambda}{2n}\frac{m}{(1+M_T^2)},$$

wherein λ is the wavelength of the light used to read the information recording medium, m is the order of interference selected from a group consisting of odd integers, n is the refractive index of the media encountered by the reading light inside the pits, and $M_T$ is the transverse magnification of the optical reader.

In addition, the invention facilitates building a system for optically reading stored information, which comprises an information recording medium having a light-reflecting surface formed as a data storage structure including pits and lands, a light source directed at the data storage structure so that the light is reflected in accordance with the information recorded using pits and lands, and an optical reader for detection of the reflected light and reading of the information recorded by means of pits and lands. According to the principles of the invention, the wavelength λ of the light used to read the information recording medium, the interference order m selected from a group consisting of odd integers, the transverse magnification $M_T$ of the optical reader, the refractive index n of the media within the pits, and the depth of the pits d satisfy the following relationship:

$$nd \simeq \frac{\lambda}{2}\frac{m}{1+M_T^2}.$$

Further features of the invention, its nature and various advantages will be more apparent from the accompanying drawings and the following detailed description of the invention.

BRIEF DESCRIPTION OF THE DRAWINGS

FIG. 1(a) shows the notation used. FIG. 1(b) shows two wavefronts $W_1$ and $W_2$ of radii $R'_1$ and $R'_2$, are centered at the points $S'_1$ and $S'_2$ respectively and passing through the center O of a circular aperture of radius a.

DETAILED DESCRIPTION OF THE INVENTION

The objects of the invention are accomplished by considering a model describing the interaction of two converging spherical waves in the focal region of an optical reading system, applying this model to investigate how the binary data recorded on a light-readable information recording medium's surface are transferred into a series of light pulses, and deriving the relationship that must govern the parameters of a light-readable information recording medium and the system used to read it, so that destructive interference leads to a maximum extinction of light in the focal region.

I. Imaging of Two Point Sources

Figure 1A:
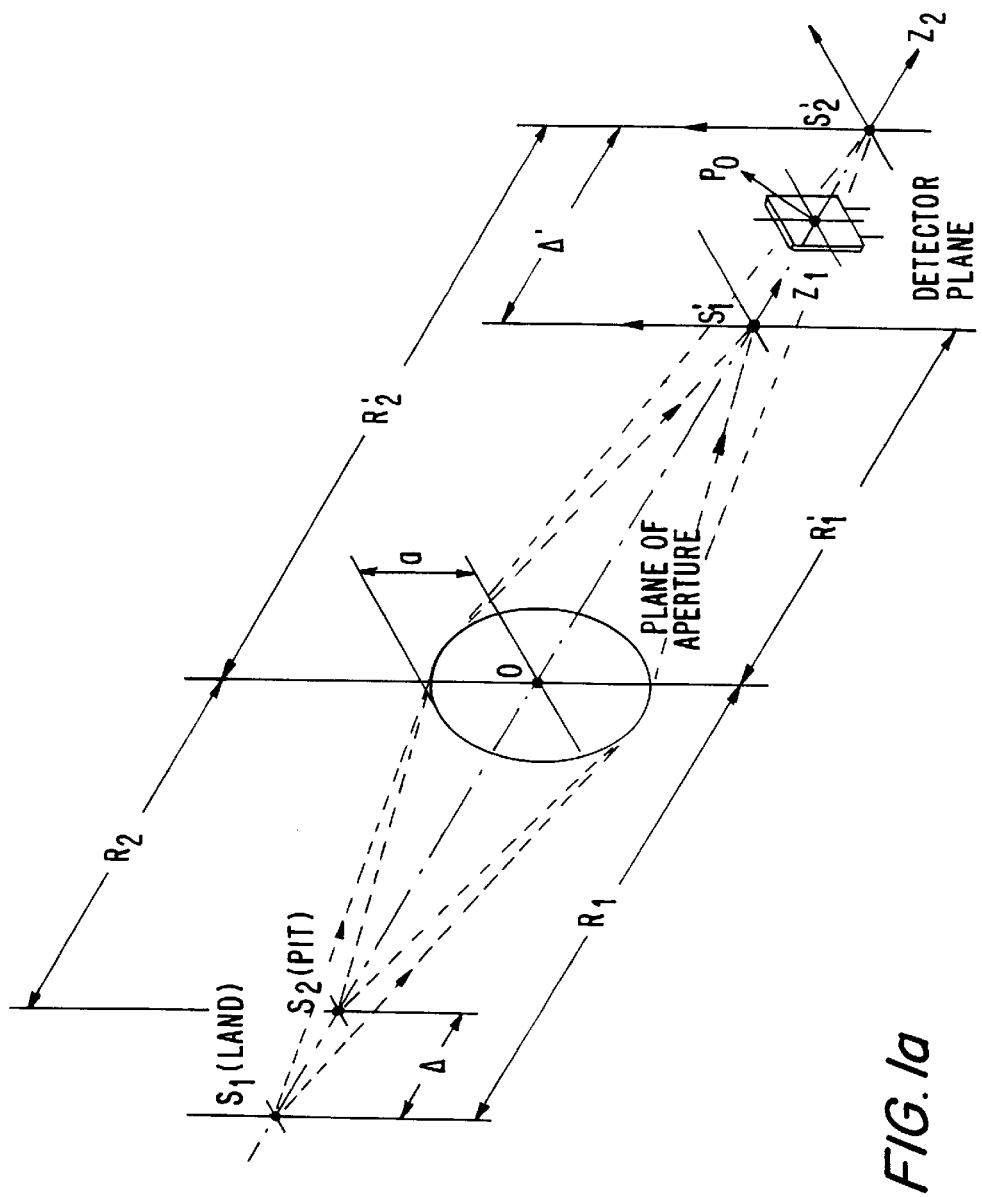
FIGS. 1(a) and 1(b) represent a two-point-source model of light interaction with a pits and lands structure: Two monochromatic point sources $S_1$ and $S_2$, generating light of the same wavelength λ, are located on the axis of the objective lens. The point source $S_1$ is associated with reflection of the light from the land. The point source $S_2$ is associated with the reflection of the light from the pit. Δ denotes the pit depth.

Consider two point sources $S_1$ and $S_2$ of light of the same wavelength λ, which are placed close to each other on the axis of a thin lens of focal length f, which fills an aperture of radius a as shown in FIG. 1(a). Let $$\Delta = R_1 - R_2 \quad (1)$$

be the separation of points $S_1$ and $S_2$, with $R_1$ and $R_2$ being the radii of curvature of the two spherical wavefronts immediately behind the thin lens. On the other side of the lens, two spherical wavefronts emerge, converging to points $S_1'$ and $S_2'$. We denote their radii of curvature by $R_1'$ and $R_2'$, respectively. For the point source $S_1$, the radii of curvature $R_1$ and $R_1'$ satisfy the lens relation:

$$\frac{1}{R_1} + \frac{1}{R_1'} = \frac{1}{f}, \quad (2)$$

and for the point source $S_2$, the radii of curvature $R_2$ and $R_2'$ satisfy a similar relation:

$$\frac{1}{R_2} + \frac{1}{R_2'} = \frac{1}{f}. \quad (3)$$

The separation of the image points $S_1'$ and $S_2'$ is given by (see FIG. 1(a)):

$$\Delta' = R_1' - R_2' = -M_T^2 \times \Delta, \quad (4)$$

where $M_T$ is the transverse magnification of the system. Here we have assumed that the two spherical wave systems have the same transverse magnification.

II. Diffraction Integrals

Figure 1B:
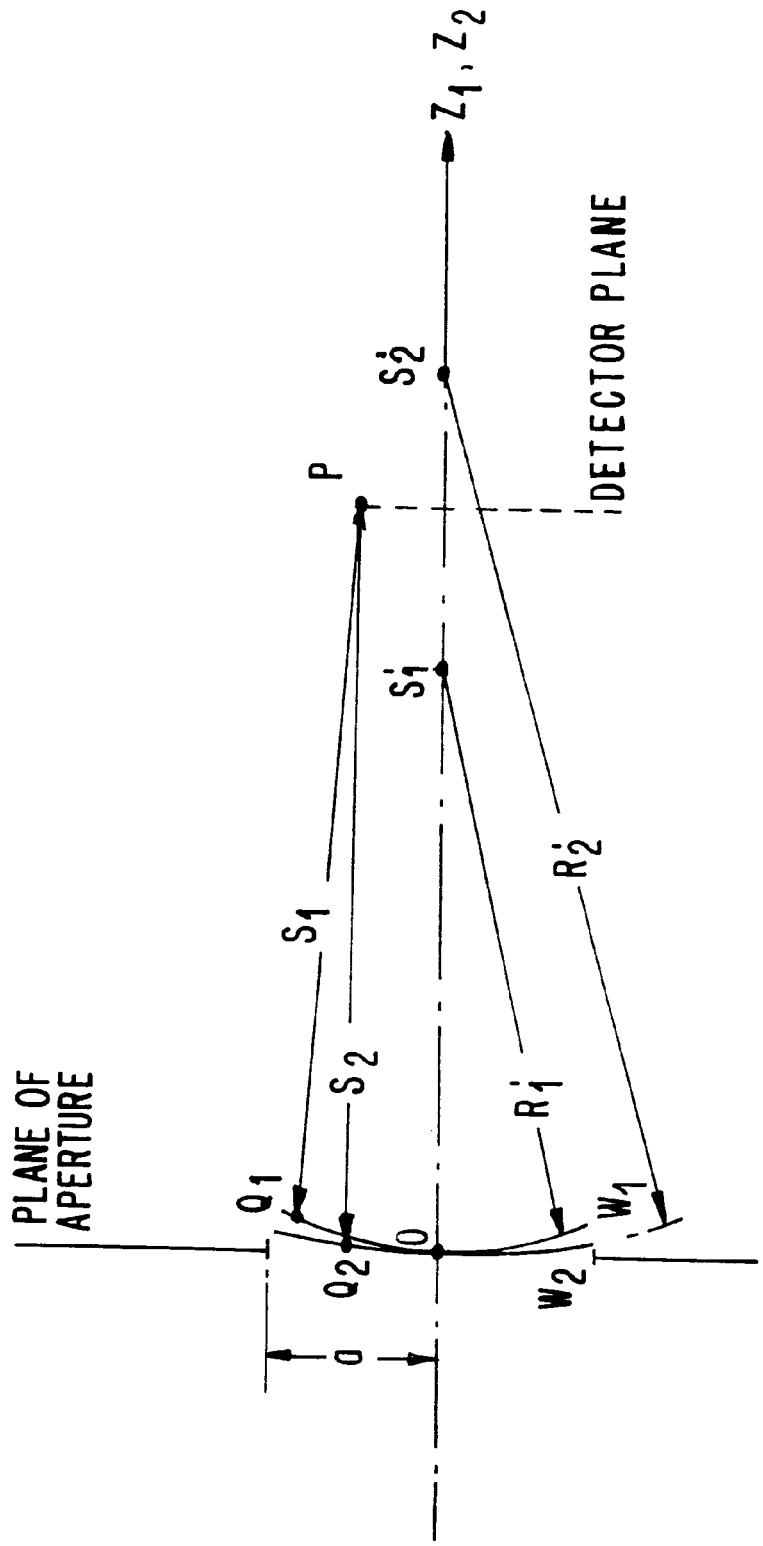

As we have indicated, we consider two spherical waves, say $V_1^{(i)}$ and $V_2^{(i)}$, generated by the two point sources $S_1$ and $S_2$, emerging from the aperture. At typical points $Q_1$ and $Q_2$ on the wavefronts (see FIG. 1 (b)) that pass through the center O of the aperture, the field distributions can be expressed in the form:

$$V_1^{(i)}(Q_1, t) = A\frac{e^{-ikR_1'}}{R_1'}e^{-i\omega t}, \quad (5a), (5b)$$

$$V_2^{(i)}(Q_2, t) = A\frac{e^{-i(kR_2' + \theta_0)}}{R_1'}e^{-i\omega t},$$

where A is a constant amplitude, t denotes the time and $$\theta_0 = k\Delta \quad (6)$$

is the phase shift introduced by the spatial separation Δ of the two point sources $S_1$ and $S_2$.

According to the Huygens-Fresnel principle (M. Born & E. Wolf, *Principles of Optics*, 7$^{th}$ ed. (1999), sec.8.2), the diffracted fields at a point P of the detector plane (see FIG. 1(b)) are given by the expressions (with time-periodic factor exp(−iωt) omitted):

$$U_1(P) = -\frac{i}{\lambda} \frac{Ae^{-ikR'_1}}{R'_1} \int\int_{W_1} \frac{e^{iks_1}}{s_1} dS, \tag{7a}$$

and $$U_2(P) = -\frac{i}{\lambda} \frac{Ae^{-i(kR'_2+\theta_0)}}{R'_2} \int\int_{W_2} \frac{e^{iks_2}}{s_2} dS, \tag{7b}$$

where $s_1$ and $s_2$ denote the distances $Q_1P$ and $Q_2P$ and the integrals extend over the wavefronts $W_1$ and $W_2$ filling the aperture.

Let $(z_1, r_1, \psi_1)$ and $(z_2, r_2, \psi_2)$ be the two sets of coordinates of the point P in the focal regions of the two converging spherical waves originating from the point sources $S_1$ and $S_2$. The origins of the two coordinate systems are at $S_1'$ and $S_2'$, namely, at the image points of the point sources $S_1$ and $S_2$. The z-coordinates of the two focusing systems have a separation $$z_1 = z_2 + \Delta', \tag{8}$$

along the common direction $OS_1'$ and $OS_2'$ (see FIG. 1(a)). The radial distances from the z-axes are:

$$r_1 = r_2 = r \tag{9}$$

and the azimuthal angles are also equal, i.e., $\psi_1 = \psi_2 = \psi$.

It is convenient to introduce the Lommel parameters ($u_1$, $v_1$) and ($u_2$, $v_2$) which, together with the angle $\psi$, specify the position of the field point P:

$$u_1 = \left(\frac{a}{R'_1}\right)^2 kz_1, \quad v_1 = \left(\frac{a}{R'_1}\right) kr_1; \tag{10a}, (10b)$$

$$u_2 = \left(\frac{a}{R'_2}\right)^2 kz_2, \quad v_2 = \left(\frac{a}{R'_2}\right) kr_2. \tag{11a}, (11b)$$

Because the fields are rotationally symmetric about the z-axis, the diffracted fields are independent of the azimuthal angle $\psi$.

The photodetector, which changes the intensity variations of the light into an electrical signal, is assumed to be placed at the point $z_1 = z_0$ in the focal regions of the two converging spherical waves. We then obtained from Eqs. (10) and (11) the following expressions for the Lommel parameters in the detector plane:

$$u_1 = \left(\frac{a}{R'_1}\right)^2 kz_0, \quad v_1 = \left(\frac{a}{R'_1}\right) kr; \tag{12a}, (12b)$$

$$u_2 = \left(\frac{a}{R'_2}\right)^2 k(\Delta' + z_0), \quad v_2 = \left(\frac{a}{R'_2}\right) kr_2 = \left(\frac{R'_1}{R'_2}\right) v_1. \tag{13a}, (13b)$$

Assuming, as is usually the case, that the focusing system of focal length f has a high numerical aperture, the field in the region of the geometrical focus may be expressed in the form (Born & Wolf, sec. 8.8):

$$U(P) = -\frac{2\pi i a^2 A}{\lambda f^2} e^{i\left(\frac{f}{a}\right)^2 u} \int_0^1 J_0(v\rho) e^{-\frac{1}{2}iu\rho^2} \rho d\rho, \tag{14}$$

where $J_0$ is the Bessel function of the first kind and zero order. We now apply Eq. (14) to the two converging spherical waves discussed in Sec. I above.

On substituting $\mu = \mu_1$, $v = v_1$ and $f = R_1'$ into Eq. (13), we obtain for the diffracted field of the first converging spherical wave the expression:

$$U_1(P) = -\frac{2\pi i a^2}{\lambda (R'_1)^2} e^{i\left(\frac{R'_1}{a}\right)^2 u_1} \int_0^1 J_0(v_1\rho) e^{-\frac{1}{2}iu_1\rho^2} \rho d\rho. \tag{15}$$

Similarly, on substituting $\mu = \mu_2$, $v = v_2$ and $f = R_2'$ into Eq. (13), we obtain the following expression of the diffracted field for the second converging spherical wave:

$$U_2(P) = -\frac{2\pi i a^2 A}{\lambda (R'_2)^2} e^{i\left(\frac{R'_2}{a}\right)^2 u_2} \int_0^1 J_0(v_2\rho) e^{-\frac{1}{2}iu_2\rho^2} \rho d\rho. \tag{16}$$

The subscripts 1 and 2 affixed to the symbol U(P) for the diffracted fields indicate that they originated from the point sources $S_1$ and $S_2$, respectively.

The field distribution in the focal region arising from the superposition of the two fields given by Eqs. (15) and (16) can be expressed as:

$$U(P) = U_1(P) + U_2(P) =$$

$$U(P) = U_1(P) + U_2(P) = \tag{17}$$

$$= -\frac{2\pi i a^2 A}{\lambda (R'_1)^2} \left\{ e^{i\left(\frac{R'_1}{a}\right)^2 u_1} \int_0^1 J_0(v_1\rho) e^{-\frac{1}{2}iu_1\rho^2} \rho d\rho + \right.$$

$$\left. e^{i\left[\left(\frac{R'_2}{a}\right)^2 u_2 - \theta_0\right]} \left(\frac{R'_1}{R'_2}\right)^2 \int_0^1 J_0(v_2\rho) e^{-\frac{1}{2}iu_2\rho^2} \rho d\rho \right\}.$$

According to Eq. (17), the intensity distribution $I(P) = |U(P)|^2$ in the focal region is, therefore, $$IP = \left| 2 \left\{ \sqrt{I_{02}} \, e^{i\left(\frac{R'_2}{a}\right)^2 u_1} \int_0^1 J_0(v_1\rho) e^{-\frac{1}{2}iu_1\rho^2} \rho d\rho + \right. \right. \tag{18}$$

$$\left. \left. \left( \sqrt{I_{02}} \, e^{i\left[\left(\frac{R'_2}{a}\right)^2 u_2 - \theta_0\right]} \int_0^1 J_0(v_2\rho) e^{-\frac{1}{2}iu_2\rho^2} \rho d\rho \right) \right\} \right|^2,$$

where $$I_{01} = \left(\frac{\pi a^2 |A|}{\lambda (R'_1)^2}\right)^2 \text{ and } I_{02} = \left(\frac{\pi a^2 |A|}{\lambda (R'_2)^2}\right)^2 \tag{19}$$

are constants.

III. The Validity of Eq. (17) In the Overlapping Focal Regions

Equation (17) is valid under the condition that the focal regions of two converging spherical waves overlap. Let us examine this situation.

Figure 2:
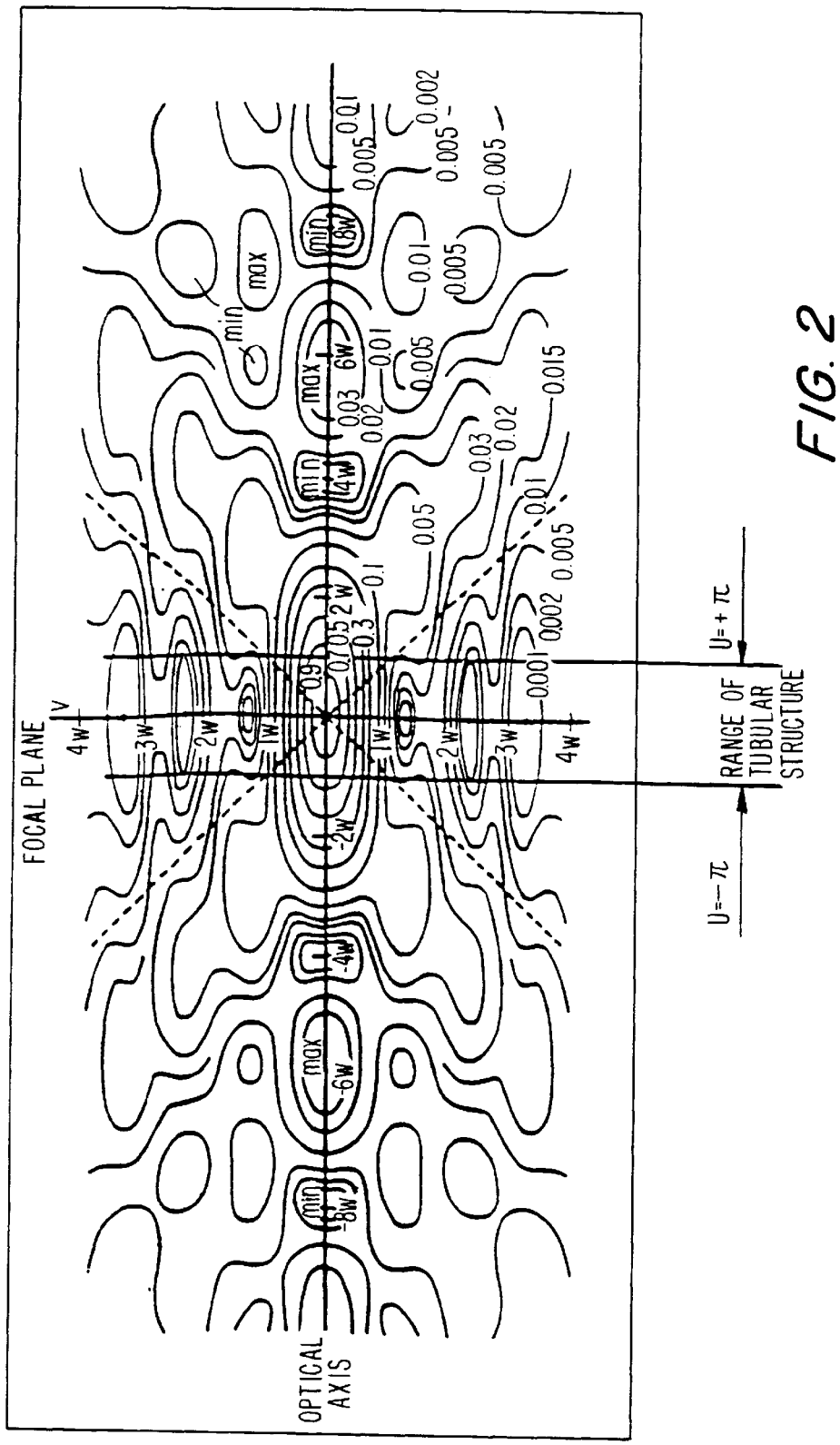
FIG. 2. represents isophotes (lines of equal intensity) in the focal region. The tubular structure of the central portion should be noted (Adapted from E. H. Linfoot and E. Wolf, *Proc. Phys. Soc.*, B, 69 (1956), 823).

The three-dimensional light distribution near the focus can be represented by isophotes, namely by contour lines of equal intensity (see FIG. 2 or FIG. 8.41 of Born & Wolf).

Important for our consideration is the tubular structure in the bright central portion of the figure, which indicates the focal depth. The focal depths of the focused fields originated from the point sources $S_1$ and $S_2$ are of the order of (Born & Wolf, Eq. (27) in sec. 8.8):

$$|\Delta z_1| = \frac{\lambda}{2}\left(\frac{R'_1}{a}\right)^2 \text{ and } |\Delta z_2| = \frac{\lambda}{2}\left(\frac{R'_2}{a}\right)^2. \quad (20a), (20b)$$

Hence Eq. (17) will be a good approximation provided that:

$$|\Delta'| \lesssim |\Delta z_1| \text{ and } |\Delta'| \lesssim |\Delta z_2|. \quad (21a), (21b)$$

On substituting for Eqs. (4), (20a) and (20b) into Eqs. (21a) and (21b), we obtain the following estimates for the range of validity of our theory:

$$M_T^2 \times \Delta \lesssim \frac{\lambda}{2}\left(\frac{R'_1}{a}\right)^2 \text{ and } M_T^2 \times \Delta \lesssim \frac{\lambda}{2}\left(\frac{R'_2}{a}\right)^2. \quad (22a), (22b)$$

With the choice $\Delta = \lambda/2$ and $M_T \approx (R_1'/R_1) \approx (R_2'/R_2)$, Eqs. (22a) and (22b) become:

$$a \leq R_1 \text{ and } a \leq R_2 \quad (23a), (23b)$$

The numerical aperture of commonly used objective lens lies in the range between about 0.43 to 0.5, i.e., $R_1$ and $R_2$ are in the range between 1.73a and 2.10a. Hence, the inequalities in Eqs. (23a) and (23b) are satisfied. We may, therefore, conclude that the tubular structures of the focal regions of two converging spherical waves overlap and Eq. (17) correctly describes the combined effects of the two waves in the overlapping focal regions.

IV. Interference Effects In the Focal Region

To obtain a better insight into the structure of the region of superposition, we rewrite Eq. (18) in the form:

$$I(P) = I_1(P) + I_2(P) + 2\sqrt{I_1(P)I_2(P)} \cos(\phi_1 - \phi_2), \quad (24)$$

where $$I_1(P) = I_{01}\left|2\int_0^1 J_0(v_1\rho)e^{-\frac{1}{2}iu_1\rho^2}\rho d\rho\right|^2, \quad (25a)$$

and $$I_2(P) = I_{02}\left|2\int_0^1 J_0(v_2\rho)e^{-\frac{1}{2}iu_2\rho^2}\rho d\rho\right|^2, \quad (25b)$$

are the intensity distributions in focal regions of the two converging spherical waves that represent the waves returning from the pit and from the surrounding land on the data surface of a recording medium respectively. After a long calculation, the phase factors $\phi_1$ and $\phi_2$ can be expressed in the form:

$$\phi_1 = \left(\frac{R'_1}{a}\right)^2 u_1, \quad (26a)$$

$$\phi_2 = \left(\frac{R'_2}{a}\right)^2 u_2 - \theta_0. \quad (26b)$$

where $\theta_0$, given by Eq. (6), represents the phase shift between the two returned waves. Let us suppose that the photodetector is located at the distance:

$$z_0 = -\Delta'/2 \quad (27)$$

from the point $S_1'$. It then follows from Eqs. (12a) and (13a) that:

$$u_1 = -k\left(\frac{a}{R'_1}\right)^2 \frac{\Delta'}{2} \text{ and } u_2 = -k\left(\frac{a}{R'_2}\right)^2 \frac{\Delta'}{2}. \quad (28a), (28b)$$

On substituting Eqs. (28a) and (28b) into Eqs. (26a) and Eq. (26b), we obtain for the phase difference $\phi_1 - \phi_2$ the expression:

$$\phi_1 - \phi_2 = \left(\frac{R_1}{a}\right)^2 u_1 - \left(\frac{R_2}{a}\right)^2 u_2 + \theta_0. \quad (29)$$

Next, on substituting from Eqs. (4), (6), (28a) and (28b) into Eq. (29), we find that:

$$\phi_1 - \phi_2 = -k\Delta' + k\Delta = k\Delta(1 + M_T^2). \quad (30)$$

When the laser spot on the disc surface scans over the pit, the phase difference $\phi_1 - \phi_2 = m\pi$, (m=1, 3, 5 . . . ). The intensity in the overlapped region is then a minimum and is given by the expression:

$$I_{min}(P) = I_1(P) + I_2(P) - 2\sqrt{I_1(P)I_2(P)}. \quad (31)$$

On the other hand, when the laser spot scans over the land, the phase difference $\phi_1 - \phi_2 = (m-1)\pi$, (m=1, 3, 5 . . . ). The intensity in the overlapped region is then a maximum and is given by the expression:

$$I_{max}(P) = I_1(P) + I_2(P) + 2\sqrt{I_1(P)I_2(P)}. \quad (32)$$

Intensity distribution in the focal region of a system of large angular aperture is symmetrical about the focal plane (see Born & Wolf, or Collett et al., *Opt. Lett.*, 5:264 (1980)). Therefore, from Eqs. (25a) and (25b):

$$I_1(-\mu_1, v_1) = I_1(\mu_1, v_1) \text{ and } I_2(-\mu_2, v_2) = I_2(\mu_2, v_2). \quad (33a), (33b)$$

If we ignore the slight difference between $R_1'$ and $R_2'$, we find immediately from Eqs. (28a) and (28b) that $$\mu_1 \approx \mu_2, \quad (34a)$$

and from Eqs. (12b) and (13b) that $$v_1 \approx v_2. \quad (34b)$$

We can therefore conclude that $$I_1(P) \approx I_2(P). \quad (34)$$

The maximum and minimum intensity distributions given by Eqs. (31) and (32) then reduce to $$I_{max}(P) \approx 4I_1(P) \quad (36a)$$

and $$I_{min}(P) \approx 0. \quad (36b)$$

The aim of pit-depth optimization is to bring the contrast, C, of the photodetector output signal to a maximum, namely, to insure that $$C \equiv \frac{I_{max}(P) - I_{min}(P)}{I_{max}(P) + I_{min}(P)} \simeq 1. \quad (37)$$

This happens when $I_{min}(P)=0$, i.e., when $$\phi_1 - \phi_2 = m\pi, (m = 1, 3, 5, \ldots) \quad (38)$$

On substituting from Eq. (29) into Eq. (38), one readily obtains for the optimum optical depth, $\Delta_{opt}$, of the information pit on the recording medium data surface the expression:

$$\Delta_{opt} = \frac{\lambda}{2} \frac{m}{1 + M_T^2}, (m = 1, 3, 5, \ldots). \quad (39)$$

Figure 3:
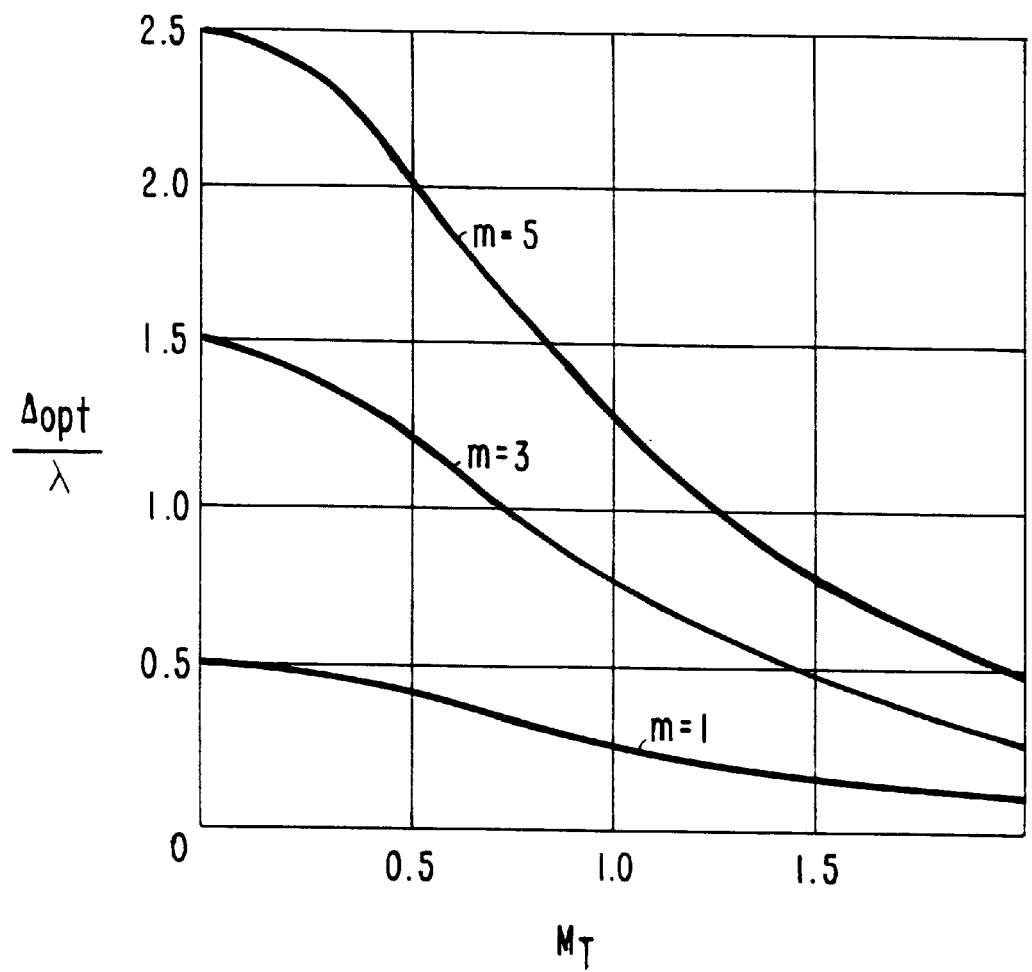
FIG. 3. shows a plot of optimum pit depth $\Delta_{opt}$ as a function of the transverse magnification $M_T$ of the system, when m=1, 3 and 5.

Equation (39) is the main result of our analysis. In FIG. 3 the optimum pit depth $\Delta_{opt}$ is plotted as a function of the transverse magnification $M_T$ for the cases when m=1, 3 and 5.

It is seen from Eq. (39) that the optimum depth $\Delta_{opt}$ of information pit is a function of three parameters: the wavelength $\lambda$, the transverse magnification $M_T$ of the system, and the order of interference m. For systems of low magnification, namely, $M_T \ll 1$, and for the lowest order, (m=1), Eq. (39) provides:

$$\Delta_{opt} \simeq \frac{\lambda}{2}. \quad (40)$$

For example, a typical CD-ROM system has a transverse magnification $M_T \approx 0.12$. The use of the half-wavelength criterion to optimize the depth of an information pit for the lowest interference order (m=1) introduces an error<1.5%, which is negligible compared to other errors in the manufacturing of such media.

Figure 4:
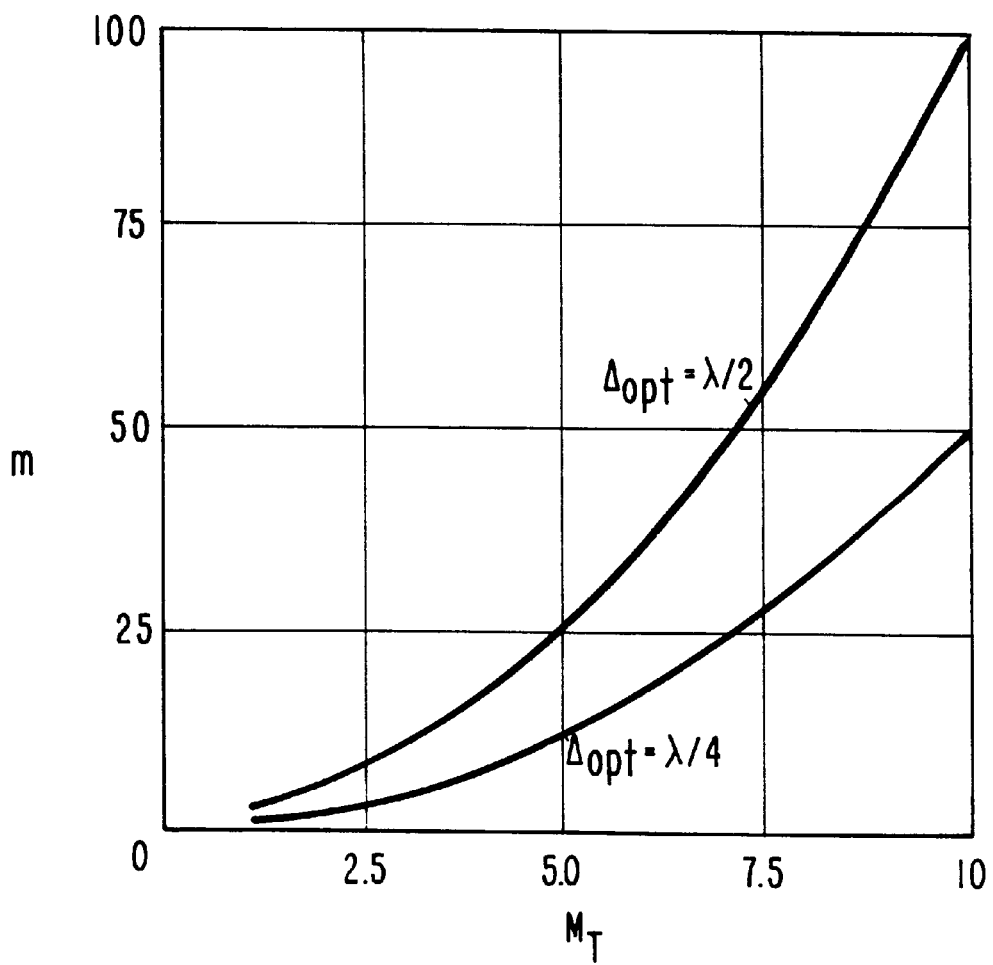
FIG. 4. shows a plot of the order of interference m as a function of the transverse magnification $M_T$ the system, when the optimum pit depth $\Delta_{opt}$ has the values λ/2 and λ/4.

However, the optimum depth $\Delta_{opt}$ decreases rapidly when the system magnification $M_T$ increases. For systems of large magnification, the optimum depth may take other values, including the conventional value $\lambda/4$. The relationship between $M_T$ and the interference order m is shown in FIG. 4 for the cases when $\Delta_{opt} = \lambda/2$ and $\Delta_{opt} = \lambda/4$.

Alternatively, the optical depth $\Delta_{opt}$ of the pits can be expressed in terms of the physical depth of the pits d and the refractive index n that is encountered by the reflected light as it travels from the bottom of a pit to the top of an adjacent land:

$$\Delta_{opt} = nd. \quad (41)$$

Accordingly, the optimum physical depth of the of the information pit on the recording medium data surface is given by the expression:

$$d = \frac{\lambda}{2n} \frac{m}{1 + M_T^2}, (m = 1, 3, 5, \ldots). \quad (42)$$

The foregoing analysis shows that the optimum pit depth is a function of four parameters: the wavelength $\lambda$, the magnification $M_T$ of the system, the order of interference m, and the refractive index n.

The objects of the present invention are accomplished by providing light-readable information recording media and optical systems for reading such information recording media with the relevant parameters substantially satisfying equation (39) or (42). The information recording medium can be a disc in which the optical structure is exposed to the air, such that the laser light strikes a reflective surface directly.

It is of no importance to the invention whether pits or bumps are utilized along with lands in the optical storage structure, as these structures are equivalent for the purposes of this invention. As can be seen from equation (39), it is the optical distance between the bump/pit and the land that is of essence. Therefore, whenever this disclosure refers to pits and their depth, these words should be interpreted to refer to bumps and their height as well. It is also implicit that the reflecting surface of a data storage structure comprising pits and lands can be only partially reflecting.

EMBODIMENT 1

Figure 5:
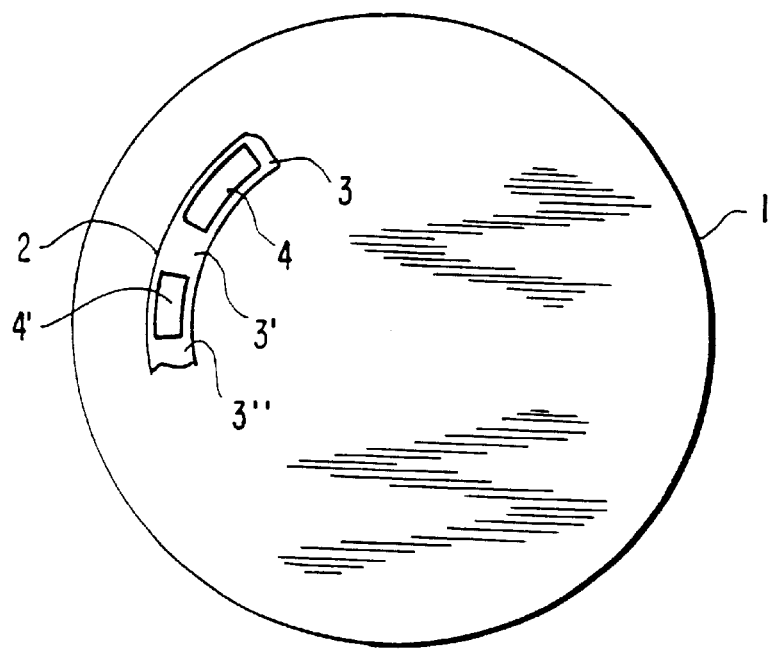
FIG. 5. is a simplified view of a light-readable information recording disc, providing an enlarged view of one path of optically recorded information.

FIG. 5 depicts a light-readable information recording medium in the shape of a disc 1, as viewed from below. The figure also shows a greatly magnified section of one path of optically recorded information 2, in which pits/bumps are designated as 4' and 4" and lands are designated as 3, 3' and 3".

Figure 6:
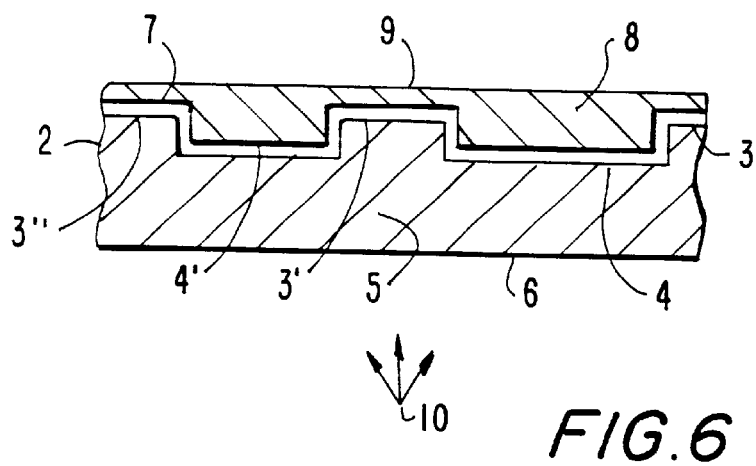
FIG. 6. is a cross-sectional view of this light-readable information recording disc, shown along the path of the recorded information.

FIG. 6 depicts a cross-sectional view along the length of this magnified section of optically recorded information 2. A transparent material 5, preferably polycarbonate (although materials such as polymethyl methacrylate and photo polymer can be used), forms the base of the disc 1, with a substantially planar lower surface 6. The top surface of the transparent material 5 is characterized by a series of lands 3, 3' and 3", separated by pits 4 and 4'. A thin layer of reflective material covers the lands 3, 3' and 3" and the pits 4 and 4' along the top surface of the transparent material 5. Although more costly materials, such as gold or silver, would yield a longer life with better reflectivity, aluminum is typically used as the reflective material 7. A protective layer 8, preferably lacquer, is placed atop the reflective material. The protective layer 8 is deposited unevenly so as to provide a substantially planar top surface 9 of the light-readable information recording disc 1. A label or other information may be placed upon this top surface 9.

Although the exact size and dimensions of the light-readable information recording disc 1 are matters of choice, the most common disc in commercial use today is 120 millimeters in diameter and 1.2 millimeters thick. The layer of reflective material 7 is preferably about 70 nanometers thick, while the protective layer 8 ranges between 10 and 30 micrometers.

Each of these dimensions, however, is independent of the depth of pits 4 and 4'. As is further shown in FIG. 6, a light source 10 is provided beneath the substantially planar lower surface 6 of the light-readable information recording disc 1. In general commercial use today, the light source 10 is a laser operating at a wavelength of 780 nanometers in air. The type of light source 10 and its operating wavelength are, however, also matters of choice.

In accordance with the present invention, the operating wavelength of the light source $\lambda$, the transverse magnification of the optical reader $M_T$, the order of interference m, selected from a group consisting of odd integers, and the refractive index n of the transparent material 5 determine the depth d of pits 4 and 4':

$$d \simeq \frac{\lambda}{2n} \frac{m}{1 + M_T^2}, (m = 1, 3, 5, \ldots).$$

Thus, for $\lambda=780$ nm, $M_T=0.5$, m=1, and n=1.55 (the refractive index of polycarbonate), the optimum depth of the pits would be about 201 nanometers.

EMBODIMENT 2

According to another aspect of the present invention, parameters of the optical system used to read an information recording medium can be selected so as to maximize the light intensity differences between lands and pits for an already set depth of the pits, such as in a commercially available CD.

As shown above, for the maximum contrast, the depth of said pits should be equal to about:

$$\frac{\lambda}{2n} \frac{m}{1+M_T^2},$$

where $\lambda$ is the wavelength of light used to read the information recording medium, m is the order of interference selected from a group consisting of odd integers, $M_T$ is the transverse magnification of the reader, and n is the refractive index of the material within the pits.

If the depth of the pits of a commercially available disc is about 114 nanometers and the refractive index n is 1.55, the optimum system parameters should satisfy the relationship:

$$353 \ (1+M_T^2) \approx m\lambda \text{(in nanometers)}$$

Choosing $\lambda=780$ nm and m=3, the optimum transverse magnification $M_T$ of the system becomes about 2.37.

EMBODIMENT 3

Finally, the present invention also facilitates building a custom-designed system for reading an information recording medium. For example, if the system requirements include a longer wavelength laser (e.g., 1064 nm in air), large magnification (e.g., 10), and a pits and lands structure that is exposed to air, the relationship of the remaining parameters is governed by the expression:

$$d\text{(in nanometers)} \approx 5.26 \ m$$

It is clear that if d is on the order of several nanometers, the manufacturing of such information recording media will be difficult and costly. In the absence of additional requirements, m can be made sufficiently large, for example 41. Under these conditions, d becomes about 216 nanometers.

It will be understood that the foregoing is only illustrative of the principles of this invention, and that various modifications can be made by those skilled in the art without departing from the scope and spirit of the invention.

The invention claimed is:

1. An information recording medium readable by a reader using reflected light comprising an optical data storage structure including pits and lands, in which the optical depth of said pits is equal to about:

$$\frac{\lambda}{2n} \frac{m}{1+M_T^2},$$

wherein $\lambda$ is a wavelength of the light used to read the information recording medium, m is selected from a group consisting of odd integers, and $M_T$ is a transverse magnification of the reader, wherein said optical pit depth, $\Delta_{opt}$, satisfies the following conditions:

$$\Delta_{opt} < \lambda/4, \ \lambda/4 < \Delta_{opt} < \lambda/2, \text{ and } \lambda/2 < \Delta_{opt}.$$

2. The information recording medium defined in claim 1, wherein $\Delta_{opt}$ satisfies the following conditions:

$$\Delta_{opt} < \lambda/4, \ \lambda/4 < \Delta_{opt} < \lambda/2, \text{ and } \lambda/2 < \Delta_{opt},$$

according to whether the transverse magnification $M_T>1$, $0<M_T<1$, or $M_T<<1$ respectively.

3. The information recording medium defined in claim 1, wherein said medium is disc-shaped.

4. An information recording medium readable by an optical reader comprising:

a transparent substrate having one substantially planar surface and a second surface opposite to said first surface, said second surface formed as a data storage structure including pits and lands, in which the depth of said pits is equal to about:

$$\frac{\lambda}{2n} \frac{m}{1+M_T^2},$$

wherein $\lambda$ is a wavelength of the light used to read the information recording medium, n is a refractive index of the substrate, m is selected from a group consisting of odd integers, and $M_T$ is a transverse magnification of the reader, wherein said pit depth, d, satisfies the following conditions:

$$d<\lambda/4n, \ \lambda/4n<d<\lambda/2n, \text{ and } \lambda/2n<d; \text{ and}$$

a light reflecting coating on said second surface for reflecting said light passed through said transparent substrate, said coating conforming to the contours of said second surface so that said light is reflected back through the transparent substrate in accordance with the information recorded by means of said pits and lands.

5. The information recording medium defined in claim 4, wherein the pit depth, d, satisfies the following conditions:

$$d<\lambda/4n, \ \lambda/4n<d<\lambda/2n, \text{ and } \lambda/2n<d, \text{ and}$$

depending on the transverse magnification $M_T$.

6. The information recording medium defined in claim 4, wherein said medium is disc-shaped.

7. The information recording medium defined in claim 4, wherein said transparent substrate is selected from the group consisting of polymethyl methacrylate, photo polymer and polycarbonate.

8. The information recording medium defined in claim 4, wherein said light-reflecting coating is selected from the group consisting of gold, silver and aluminum.

9. An information recording medium readable by an optical reader comprising:

a transparent substrate having one substantially planar surface and a second surface opposite to said first surface, said second surface formed as a data storage structure including pits and lands, in which the depth of said pits is equal to about:

$$\frac{\lambda}{2n} \frac{m}{1+M_T^2},$$

wherein $\lambda$ is a wavelength of the light used to read the information recording medium, n is a refractive index of the substrate, m is selected from a group consisting of odd integers, and $M_T$ is a transverse magnification, wherein said pit depth, d, satisfies the following conditions:

$$d<\lambda/4n, \ \lambda/4n<d<\lambda/2n, \text{ and } \lambda/2n<d;$$

a light-reflecting coating on said second surface for reflecting said light passed through said transparent substrate, said coating conforming to the contours of said second surface so that said light is reflected back through the transparent substrate in accordance with the information recorded by means of said pits and lands; and a protective coating having a first surface conforming to the contours of said light-reflecting coating and a second surface opposite to said first surface being substantially planar.

10. The information recording medium defined in claim 9, wherein the pit depth, d, satisfies the following conditions:

$$d<\lambda/4n, \lambda/4n<d<\lambda/2n, \text{ and } \lambda/2n<d,$$

depending on the transverse magnification $M_T$.

11. The information recording medium defined in claim 9, wherein said medium is disc-shaped.

12. The information recording medium defined in claim 9, wherein said transparent substrate is selected from the group consisting of polymethyl methacrylate, photo polymer and polycarbonate.

13. The information recording medium defined in claim 9, wherein said light-reflecting coating is selected from the group consisting of gold, silver and aluminum.

14. The information recording medium defined in claim 9, wherein said protective coating is lacquer.

15. An information-recording medium readable by an optical reader comprising a light-reflecting surface formed as a data storage structure including pits and lands, in which the optical depth of said pits is equal to about:

$$\frac{\lambda}{2n}\frac{m}{1+M_T^2},$$

wherein $\lambda$ is a wavelength of the light used to read the information recording medium, m is selected from a group consisting of odd integers, and $M_T$ is a transverse magnification of the reader, wherein said optical pit depth, $\Delta_{opt}$ satisfies the following conditions:

$$\Delta_{opt}<\lambda/4, \lambda/4<\Delta_{opt}<\lambda/2, \text{ and } \lambda/2<\Delta_{opt}.$$

16. The information recording medium defined in claim 15, wherein the optical pit depth, $\Delta_{opt}$, satisfies the following conditions:

$$\Delta_{opt}<\lambda/4, \lambda/4<\Delta_{opt}<\lambda/2, \text{ and } \lambda/2<\Delta_{opt},$$

depending on the transverse magnification $M_T$.

17. The information recording medium defined in claim 15, wherein said medium is disc-shaped.

18. The information recording medium defined in claim 15, wherein said light-reflecting surface is selected from the group consisting of gold, silver and aluminum.

19. A method of manufacturing an information recording medium having a data storage structure including pits and lands readable by an optical reader, said method comprising:

providing a wavelength $\lambda$ of light used to read the medium, a refractive index n encountered by the reading light inside the pits, an order of interference m selected from a group consisting of odd integers, and a transverse magnification $M_T$ of the reader;

determining said pit depth substantially according to:

$$\frac{\lambda}{2n}\frac{m}{1+M_T^2};$$

and manufacturing said information recording medium having said pit depth.

20. A method of designing an information recording medium having a data storage structure including pits and lands readable by an optical reader, said method comprising:

providing a wavelength $\lambda$ of light used to read the medium, an order of interference m selected from a group consisting of odd integers, and a transverse magnification $M_T$ of the reader;

selecting the pit depth and a refractive index n encountered by the reading light inside the pits, so that these parameters satisfy the relationship:

$$nd \simeq \frac{\lambda}{2}\frac{m}{1+M_T^2}.$$

21. A system for optically reading an information recording medium having a data storage structure including pits and lands, in which the optical depth of said pits, $\Delta_{opt}$, is greater than or less than $\lambda/2$, said system comprising:

a light source of a wavelength $\lambda$ directed at said data storage structure, such that light generated thereby is reflected by the data storage structure in accordance with the information recorded by means of said pits and lands; and an optical reading structure, having transverse magnification $M_T$, for detection of said reflected light and reading of the information recorded by means of said pits and lands, wherein:

$$\Delta_{opt} \simeq \frac{\lambda}{2}\frac{m}{1+M_T^2},$$

wherein m is selected from a group consisting of odd integers.

22. The system for optically reading an information recording medium defined in claim 21, wherein the optical depth of said pits, $\Delta_{opt}$, is greater than or less than $\lambda/2$, depending on the transverse magnification $M_T$.

23. The system for optically reading an information recording medium defined in claim 21, wherein $\Delta_{opt}$ is equal to about $\lambda/4$.

24. A method of designing a system for optically reading an information recording medium having a data storage structure including pits and lands, said method comprising:

providing an optical depth $\Delta_{opt}$ of the pits;

selecting a wavelength $\lambda$ of light used to read the information recording medium, an order of interference m selected from a group consisting of odd integers, and a transverse magnification $M_T$ of the optical reader, so that these parameters satisfy the relationship:

$$\Delta_{opt} \simeq \frac{\lambda}{2}\frac{m}{1+M_T^2}.$$

25. A method of designing a system for optically reading an information recording medium having a data storage structure including pits and lands, said method comprising:

providing a depth of the pits d and a refractive index n encountered by the reading light inside the pits;

selecting a wavelength λ of light used to read the information recording medium, an order of interference m selected from a group consisting of odd integers, and a transverse magnification $M_T$ of the optical reader, so that these parameters satisfy the relationship:

$$nd \simeq \frac{\lambda}{2} \frac{m}{1+M_T^2}.$$

26. A method of manufacturing a system for optically reading an information recording medium having a data storage structure including pits and lands, said method comprising:

providing an optical depth $\Delta_{opt}$ of the pits;

selecting a wavelength λ of light used to read the information recording medium, an order of interference m selected from a group consisting of odd integers, and a transverse magnification $M_T$ of the optical reader, so that these parameters satisfy the relationship:

$$\Delta_{opt} \simeq \frac{\lambda}{2} \frac{m}{1+M_T^2}; \text{ and}$$

and manufacturing the system having said parameters.

27. A method of manufacturing a system for optically reading an information recording medium having a data storage structure including pits and lands, said method comprising:

providing a depth of the pits d and a refractive index n encountered by the reading light inside the pits;

selecting a wavelength λ of light used to read the information recording medium, an order of interference m selected from a group consisting of odd integers, and a transverse magnification $M_T$ of the optical reader, so that these parameters satisfy the relationship:

$$nd \simeq \frac{\lambda}{2} \frac{m}{1+M_T^2}; \text{ and}$$

and manufacturing the system having said parameters.

28. A system for optically reading stored information comprising:

an information recording medium having a light-reflecting surface formed as a data storage structure including pits and lands, in which an optical depth of said pits, $\Delta_{opt}$, is greater than or less than λ/2;

a light source of a wavelength λ directed at said data storage structure, such that light generated thereby is reflected by the light-reflecting surface in accordance with the information recorded by means of said pits and lands; and an optical reading structure, having a transverse magnification $M_T$, for detection of said reflected light and reading of the information recorded by means of said pits and lands, wherein:

$$\Delta_{opt} \simeq \frac{\lambda}{2} \frac{m}{1+M_T^2},$$

wherein m is selected from a group consisting of odd integers.

29. The system for optically reading an information recording medium defined in claim 28, wherein the optical depth of said pits, $\Delta_{opt}$, is greater than or less than λ/2, depending of the transverse magnification $M_T$.

30. The system for optically reading stored information defined in claim 28, wherein the information recording medium is disc-shaped.

31. The system for optically reading stored information defined in claim 28, wherein said light-reflecting surface is selected from the group consisting of gold, silver and aluminum.

32. A system for optically reading stored information comprising:

an information recording medium having a first substantially planar surface, a second surface formed as a data storage structure including pits and lands, in which an optical depth of said pits, $\Delta_{opt}$, is greater than or less than λ/2, and a light-reflecting coating adherent to the contours of said second surface;

a light source of a wavelength λ directed at said data storage structure, such that light generated thereby is reflected by the light-reflecting surface in accordance with the information recorded by means of said pits and lands; and an optical reading structure, having a transverse magnification $M_T$, for detection of said reflected light and reading of the information recorded by means of said pits and lands, wherein:

$$\Delta_{opt} \simeq \frac{\lambda}{2} \frac{m}{1+M_T^2},$$

wherein m is selected from a group consisting of odd integers.

33. The system for optically reading an information recording medium defined in claim 32, wherein the optical depth of said pits, $\Delta_{opt}$, is greater than or less than λ/2, depending of the transverse magnification $M_T$.

34. The system for optically reading stored information defined in claim 32, wherein the information recording medium is disc-shaped.

35. The system for optically reading stored information defined in claim 32, wherein said light-reflecting surface is selected from the group consisting of gold, silver and aluminum.

36. A system for optically reading stored information comprising:

an information recording medium having a first substantially planar surface, a second surface formed as a data storage structure including pits and lands, in which an optical depth of said pits, $\Delta_{opt}$, is greater than or less than λ/2, a light-reflecting coating adherent to the contours of said second surface, and a protective coating having a first surface conforming to said light-reflecting coating and a second substantially planar surface opposite to said first surface;

a light source of a wavelength λ directed at said data storage structure, such that light generated thereby is reflected by the light-reflecting surface in accordance with the information recorded by means of said pits and lands; and an optical reading structure, having a transverse magnification $M_T$, for detection of said reflected light and reading of the information recorded by means of said pits and lands, wherein:

$$\Delta_{opt} \simeq \frac{\lambda}{2} \frac{m}{1+M_T^2},$$

wherein m is selected from a group consisting of odd integers.

37. The system for optically reading an information recording medium defined in claim 36, wherein the optical depth of said pits, $\Delta_{opt}$, is greater than or less than $\lambda/2$, depending of the transverse magnification $M_T$.

38. The system for optically reading stored information defined in claim 36, wherein the information recording medium is disc-shaped.

39. The system for optically reading stored information according to claim 36, wherein said light-reflecting surface is selected from the group consisting of gold, silver and aluminum.

40. The system for optically reading stored information according to claim 36, wherein said second protective coating on the information recording disc is lacquer.

41. A method of designing a system for optically reading an information recording medium having a data storage structure including pits and lands, said method comprising:

providing at least one but no more than three system parameters selected from a group consisting of a wavelength $\lambda$ of light used to read the information recording medium, a refractive index n encountered by the reading light inside the pits, an order of interference m selected from a group consisting of odd integers, a transverse magnification $M_T$ of the optical reader, and a depth d of the pits; and selecting the remaining parameters so that they satisfy the relationship:

$$nd \simeq \frac{\lambda}{2} \frac{m}{1+M_T^2}.$$

42. A method of manufacturing a system for optically reading an information recording medium comprising a data storage structure including pits and lands, said method comprising:

providing at least one but no more than three system parameters selected from a group consisting of a wavelength $\lambda$ of light used to read the information recording medium, a refractive index n encountered by the reading light inside the pits, an order of interference m selected from a group consisting of odd integers, a transverse magnification $M_T$ of the optical reader, and a depth d of the pits;

selecting the remaining parameters so that they satisfy the relationship:

$$nd \simeq \frac{\lambda}{2} \frac{m}{1+M_T^2}.$$

43. A method of designing a system for optically reading an information recording medium having a data storage structure including pits and lands, said method comprising:

providing an order of interference m selected from a group consisting of odd integers;

providing three system parameters selected from a group consisting of a wavelength $\lambda$ of light used to read the information recording medium, a refractive index n encountered by the reading light inside the pits, a transverse magnification $M_T$ of the optical reader, and a depth d of the pits; and selecting the remaining parameter so that it satisfies the relationship:

$$nd \simeq \frac{\lambda}{2} \frac{m}{1+M_T^2}.$$

44. A method of manufacturing a system for optically reading an information recording medium comprising a data storage structure including pits and lands, said method comprising:

providing an order of interference m selected from a group consisting of odd integers;

providing three system parameters selected from a group consisting of a wavelength $\lambda$ of light used to read the information recording medium, a refractive index n encountered by the reading light inside the pits, a transverse magnification $M_T$ of the optical reader, and a depth d of the pits;

selecting the remaining parameter so that it satisfies the relationship:

$$nd \simeq \frac{\lambda}{2} \frac{m}{1+M_T^2}; \text{ and}$$

and manufacturing said optical system having said parameters.

* * * * *

UNITED STATES PATENT AND TRADEMARK OFFICE
CERTIFICATE OF CORRECTION

| | | |
|---|---|---|
| PATENT NO. | : 6,771,585 B2 | |
| APPLICATION NO. | : 09/843343 | |
| DATED | : August 03, 2004 | |
| INVENTOR(S) | : Li et al. | |

It is certified that error appears in the above-identified patent and that said Letters Patent is hereby corrected as shown below:

Cover page, Abstract: Change "$\dfrac{\lambda}{2n}\dfrac{M}{1+m^2_T}$" to -- $\dfrac{\lambda}{2n}\dfrac{m}{1+M_T^2}$ --

Throughout the printed patent: items such as "n, d, m, t, λ, M, O, Q, P, S, T, W" should all be italicized.

Column 5, line 33: Change "$\mu$" to -- $u$ --.

Column 5, line 34: Change "$\mu$" to -- $u$ --.

Column 5, line 56: Change "$kr$" to -- $kr_1$ -- in Eq. (12a), (12b).

Column 6, line 8: Change two occurrences of "$\mu$" to -- $u$ --.

Column 6, line 13: Change "$2\pi i a^2$" to -- $2\pi i a^2 A$ -- in Eq. (15).

Column 6, line 32: Delete 2nd occurrence of "$U(P) = U_1(P) + U_2(P) =$".

Column 6, line 45: Change "$IP$" to -- $I(P)$ -- in 1st line of Eq. (18).

Column 6, line 45: Delete extra parentheses in 2nd line of Eq. (18).

Column 8, line 41: Change four occurrences of "$\mu$" to -- $u$ --. in Eq. (33a),(33b).

Column 8, line 46: Change two occurrences of "$\mu$" to -- $u$ --. in Eq. (34a).

UNITED STATES PATENT AND TRADEMARK OFFICE
CERTIFICATE OF CORRECTION

PATENT NO. : 6,771,585 B2
APPLICATION NO. : 09/843343
DATED : August 03, 2004
INVENTOR(S) : Li et al.

It is certified that error appears in the above-identified patent and that said Letters Patent is hereby corrected as shown below:

Column 9, line 33: Change "$M_T \approx 0.12$" to -- $M_T \simeq 0.12$ --.

Column 9, line 51: Delete 2nd occurrence of "of the".

Column 11, line 24: Change "$353\ (1+M_T^2) \approx m\lambda$" to -- $353\ (1+M_T^2) \simeq m\lambda$ --.

Column 11, line 37: Change "$d$(in nanometers)$\approx 5.26\ m$" to -- d(in nanometers)$\simeq 5.26\ m$ --.

Column 11, line 55: Change "$\frac{\lambda}{2n}$" to -- $\frac{\lambda}{2}$ --.

Column 12, line 25: Change "d< λ4$n$" to -- $d$< λ/4$n$--.

Column 12, line 35: Change "$d$< λ4$n$" to -- $d$< λ/4$n$--.

Column 12, line 64: Change "$d$< λ4$n$" to -- $d$< λ/4$n$--.

Column 13, line 35: Change "$\frac{\lambda}{2n}$" to -- $\frac{\lambda}{2}$ --.

Column 18, line 49: Delete 2nd occurrence of "and"

Signed and Sealed this

Twenty-first Day of November, 2006

JON W. DUDAS
*Director of the United States Patent and Trademark Office*